(12) United States Patent
Lei et al.

(10) Patent No.: US 10,318,133 B2
(45) Date of Patent: *Jun. 11, 2019

(54) DISPLAY CONTROL OF AN IMAGE ON A DISPLAY SCREEN

(71) Applicant: International Business Machines Corporation, Armonk, NY (US)

(72) Inventors: Chang Lei, Shanghai (CN); Xiao Xia Mao, Shanghai (CN); Wen Wen Yang, Shanghai (CN); Jie Zhu, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/117,340

(22) Filed: Aug. 30, 2018

(65) Prior Publication Data

US 2018/0373417 A1   Dec. 27, 2018

Related U.S. Application Data

(63) Continuation of application No. 15/907,389, filed on Feb. 28, 2018, which is a continuation of application
(Continued)

(51) Int. Cl.
*G06T 3/40*   (2006.01)
*G06F 3/0484*   (2013.01)
(Continued)

(52) U.S. Cl.
CPC .......... *G06F 3/04845* (2013.01); *G06F 1/163* (2013.01); *G06F 3/04842* (2013.01);
(Continued)

(58) Field of Classification Search
CPC ...................................................... G09G 5/00
See application file for complete search history.

(56) References Cited

U.S. PATENT DOCUMENTS 9,996,235 B2    6/2018  Lei
2010/0318895 A1  12/2010  Steinberger
(Continued)

FOREIGN PATENT DOCUMENTS

WO   WO2012144984   10/2012
WO   WO 2015030564   3/2015
(Continued)

OTHER PUBLICATIONS

P. Mell, et al. "*The NIST Definition of Cloud Computing*", NIST Special Publication 800-145, Sep. 2011, Gaithersburg, MD.
(Continued)

*Primary Examiner* — Phi Hoang
(74) *Attorney, Agent, or Firm* — Isaac J. Gooshaw, Esq.; George S. Blasiak, Esq.; Heslin Rothenberg Farley & Mesiti PC

(57) ABSTRACT

Methods, computer program products, and systems, for example, for controlling display of an image on a display screen includes, for example, receiving, by one or more processor, data regarding a user selected area relative to a first portion of an image displayed on a display screen to define a second portion of the image, at least a portion of the second portion of the image being outside the first portion of the image displayed on the display screen, and automatically controlling, by the one or more processor, display of the second portion of the image on the display screen based on the user selected area of the image to generally maximize display of the second portion of the image within the display screen.

20 Claims, 11 Drawing Sheets

Related U.S. Application Data

No. 14/884,434, filed on Oct. 15, 2015, now Pat. No. 9,996,235.

(51) Int. Cl.
| | | |
|---|---|---|
| *G06F 1/16* | (2006.01) | |
| *G06T 3/20* | (2006.01) | |
| *G06F 3/0488* | (2013.01) | |

(52) U.S. Cl.
CPC ............ *G06F 3/04883* (2013.01); *G06T 3/20* (2013.01); *G06T 3/40* (2013.01); *G06F 2203/04808* (2013.01)

(56) References Cited

U.S. PATENT DOCUMENTS

| 2011/0187750 | A1* | 8/2011 | Ko ........................... G09G 5/00 345/661 |
| --- | --- | --- | --- |
| 2011/0215914 | A1 | 9/2011 | Edwards |
| 2011/0316887 | A1 | 12/2011 | Fan |
| 2012/0194559 | A1 | 8/2012 | Lim |
| 2012/0280897 | A1 | 11/2012 | Balan |
| 2013/0239015 | A1 | 9/2013 | Forest |
| 2013/0265222 | A1 | 10/2013 | Berenson |
| 2013/0328777 | A1* | 12/2013 | Johnson ............... H04N 13/361 345/161 |
| 2014/0237356 | A1 | 8/2014 | Durga |
| 2016/0027201 | A1* | 1/2016 | Saito .................. H04N 5/23216 345/475 |
| 2016/0105528 | A1* | 4/2016 | Holmes ............. G06F 17/30864 709/217 |
| 2018/0188928 | A1 | 7/2018 | Lei |

FOREIGN PATENT DOCUMENTS

| WO | WO2015199280 | * 12/2015 | ............ G06F 3/017 |
| --- | --- | --- | --- |
| WO | WO 2015199280 | 12/2015 | |

OTHER PUBLICATIONS

J. Tanous, "*Make Items on the Screen Bigger with Windows Magnifier*", TechReview Weekly Digest, Printout available online at http://www.tekrevue.com/tip/make-items-on-the-screen-bigger-with-windows-magnified, 5 pages, May 26, 2015.

Jun Rekimoto, "GestureWrist and GesturePad: Unobstrusive Wearable Interaction Devices", Fifth International Symposium on Wearable Computers, IEEE, pp. 21-27, 2001.

Paul Yi Tung, Ooi; "Tracking an Object From a Live Video Input", CodeProject, http://www.codeproject.com/Articles/8374/Tracking-an-object-from-a live-video-input, 7 pages, May 2005.

Sugandi et al., "Real Time Object Tracking and Identification Using a Camera", The 23rd International Technical Conference on Circuits/Systems, Computers and Communications, 4 pages, 2008.

Fisheye Lens 180 Degree Super Wide Angle for !Phone 6/Samsung S5/Note, Shenzhen C-Double Tec, Co. Ltd, online product description at http://www.smartphonetelephotolens.com/sale-3929121-fisheye-lens-180-degree-super-wideangle-for-iphone-6-samsung-s5-note.html, 3 pages, at least as early as Jul. 20, 2015.

David Knight, "Optical Magnification", Camera's Underwater, available online at http://www.camerasunderwaterco.uk/articles/optics/opt-mag, 9 pages, at least as early as May 4, 2013.

List of IBM Patent and/or Patent Applications treated as related for U.S. Appl. No. 16/117,340, filed Aug. 30, 2018, dated Sep. 20, 2018.

Notice of Allowance, U.S. Appl. No. 15/907,389, filed Feb. 28, 2018, dated Oct. 23, 2018.

Issue Fee Payment, U.S. Appl. No. 15/907,389, filed Feb. 28, 2018, dated Jan. 18, 2019.

Non-Final Office Action, U.S. Appl. No. 15/907,389, filed Feb. 28, 2018, dated May 16, 2018.

Applicant's Response to Non-Final Office Action, U.S. Appl. No. 15/907,389, filed Feb. 28, 2018, dated Jun. 20, 2018.

Applicant's 312 Amendment, U.S. Appl. No. 15/907,389, filed Feb. 28, 2018, dated Dec. 27, 2018.

Response to Amendment under Rule 312, U.S. Appl. No. 15/907,389, filed Feb. 28, 2018, dated Jan. 4, 2019.

Non-Final Office Action, U.S. Appl. No. 14/884,434, filed Oct. 15, 2015, dated Oct. 20, 2016.

Applicant's Response to Non-Final Office Action, U.S. Appl. No. 14/884,434, filed Oct. 15, 2015, dated Jan. 20, 2017.

Final Office Action, U.S. Appl. No. 14/884,434, filed Oct. 15, 2015, dated May 17, 2017.

Applicant's Response to Final Office Action, U.S. Appl. No. 14/884,434, filed Oct. 15, 2015, dated Jul. 17, 2017.

Non-Final Office Action, U.S. No. 14/884,434, filed Oct. 15, 2015, dated Sep. 15, 2017.

Applicant's Response to Non-Final Office Action, U.S. Appl. No. 14/884,434, filed Oct. 15, 2015, dated Dec. 15, 2017.

Notice of Allowance, U.S. Appl. No. 14/884,434, filed Oct. 15, 2015, dated Feb. 22, 2018.

Issue Fee Payment, U.S. Appl. No. 14/884,434, filed Oct. 15, 2015, dated May 3, 2018.

\* cited by examiner

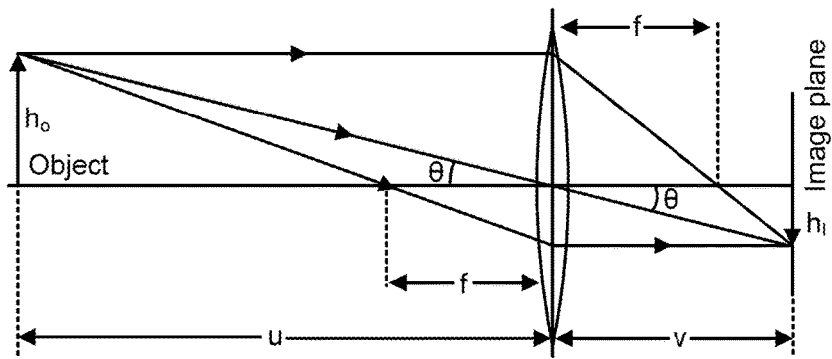
FIG. 14
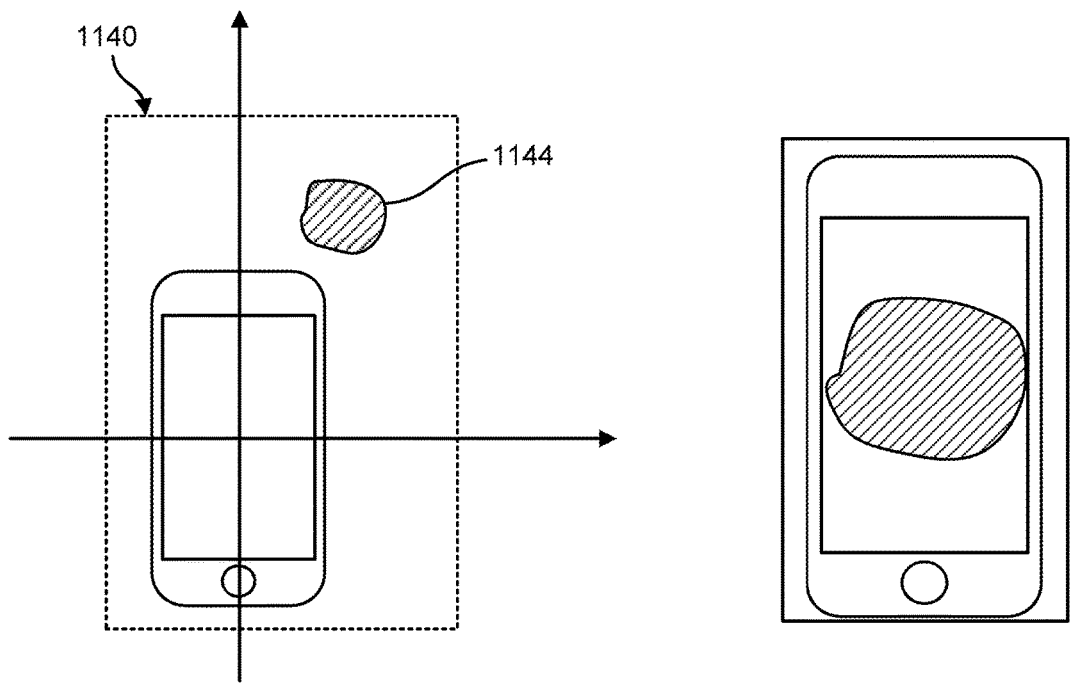
FIG. 15  FIG. 16 ed area of the image to maximize display of the second portion of the image within the display screen.

In a further embodiment, a system is provided. The system includes: a memory; and one or more processor in communication with the memory, where the system is configured to perform a method. The method includes, for example, receiving, by one or more processor, data regarding a user selected area relative to a first portion of an image displayed on a display screen to define a second portion of the image, at least a portion of the second portion of the image being outside the first portion of the image displayed on the display screen, and automatically controlling, by the one or more processor, display of the second portion of the image on the display screen based on the user selected area of the image to maximize display of the second portion of the image within the display screen.

Additional features and advantages are realized through the techniques set forth herein. Other embodiments are described in detail herein and are considered a part of the claimed invention.

DISPLAY CONTROL OF AN IMAGE ON A DISPLAY SCREEN

CROSS-REFERENCE TO RELATED APPLICATION

This application is a continuation of U.S. patent application Ser. No. 15/907,389, filed Feb. 28, 2018, entitled, "Display Control of an Image on a Display Screen," which is incorporated by reference herein in its entirety, which is a continuation of U.S. patent application Ser. No. 14/884,434, filed Oct. 15, 2015, entitled, "Display Control of an Image on a Display Screen," which is incorporated by reference herein in its entirety.

TECHNICAL FIELD

The present disclosure relates generally to electronic image display, and more particularly, to methods, computer program products, and systems, for example, for controlling display of an image on a display screen.

BACKGROUND

Conventional 2-point touch technology is employed for zooming in and out of an image displayed on a display screen of an electronic device such as a portable device. As one increases or decreases the distance between one's two fingers, the page is gradually zoomed in or out, respectively. If a portion of an image such as an image of a map having a driving route highlighted is desired for display or view on a full screen, one may need to zoom in to magnify a portion of the image. In addition, if a portion of the image such as an image of a map having a driving route highlighted moves out of a display screen, one needs to then move or slide the image relative to the display screen to ensure that the desired area of the image fits within the display screen.

SUMMARY

Shortcomings of the prior art are overcome and additional advantages are provided through the provision, in one embodiment, of a method which includes, for example, receiving, by one or more processor, data regarding a user selected area relative to a first portion of an image displayed on a display screen to define a second portion of the image, at least a portion of the second portion of the image being outside the first portion of the image displayed on the display screen, and automatically controlling, by the one or more processor, display of the second portion of the image on the display screen based on the user selected area of the image to maximize display of the second portion of the image within the display screen.

In another embodiment, a computer program product is provided. The computer program product includes: a computer readable storage medium readable by one or more processor and storing instructions for execution by the one or more processing unit for performing a method which includes, for example, receiving, by one or more processor, data regarding a user selected area relative to a first portion of an image displayed on a display screen to define a second portion of the image, at least a portion of the second portion of the image being outside the first portion of the image displayed on the display screen, and automatically controlling, by the one or more processor, display of the second portion of the image on the display screen based on the user select-

BRIEF DESCRIPTION OF THE DRAWINGS

One or more embodiments of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 14 illustrates an arrangement an object, a camera lens, and an image plane;

FIGS. 15 and 16 illustrate coordinates for translating and resizing a user selected target area for controlling an image for display on an display screen according to an embodiment of the present invention.

DETAILED DESCRIPTION

Figure 1:
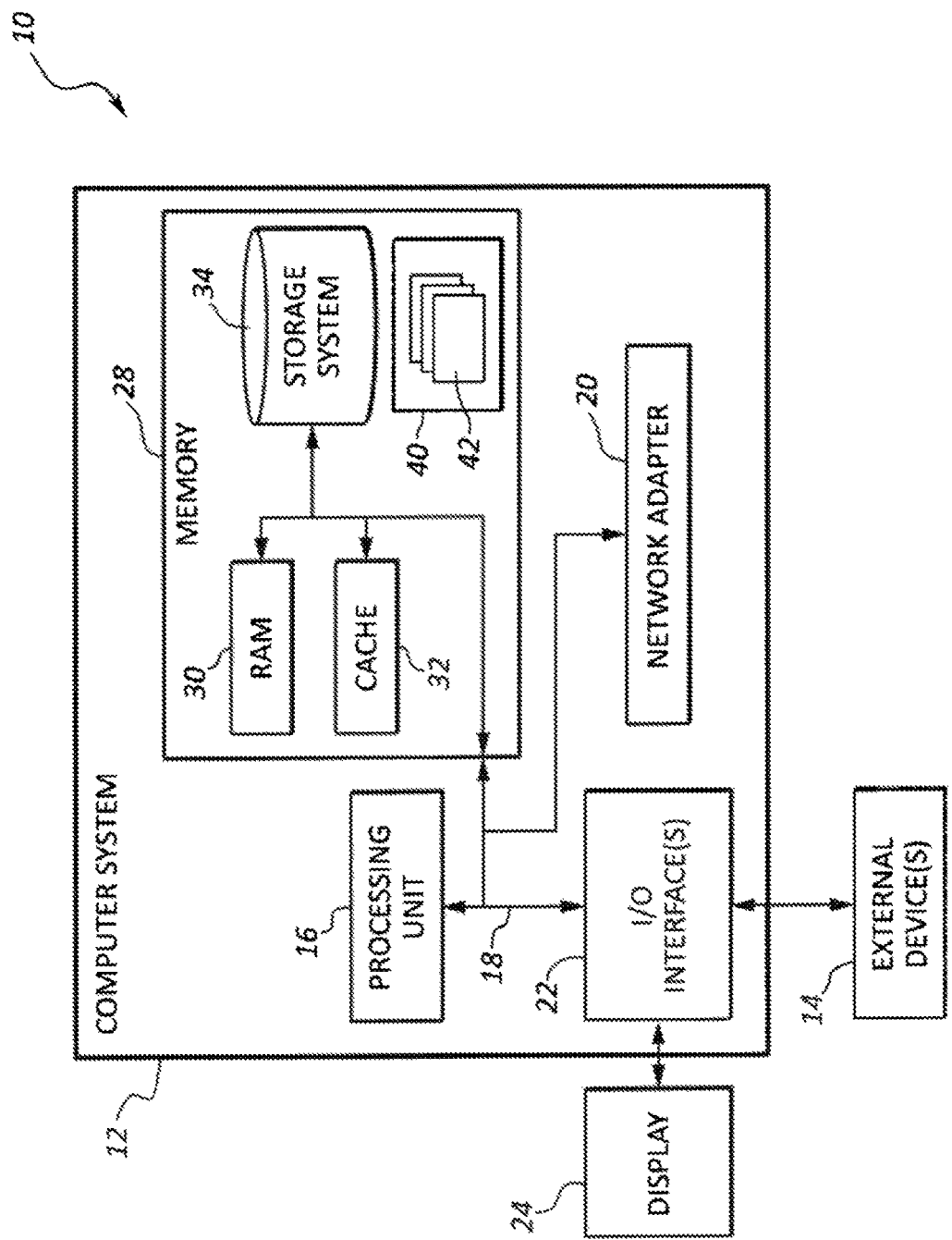
FIG. 1 depicts a cloud computing node according to an embodiment of the present invention.

Embodiments of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating embodiments of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products systems, network devices, and virtual machine management software, for example, for controlling display of an image on a display screen. The technique of the present disclosure allows a user to readily select a target area of an image in a display for automatic display of the user selected target area on the display screen. The technique of the present disclosure may allow for quickly fitting a user selected target area of an image into a full screen of a display screen, e.g., automatically translate, zoom in, and/or zoom out of a user selected target area of an image for display on the display screen. As described below, the desired portion of the image for display on the display screen may include a portion of the image initially not displayed on the display screen, or display of a portion of the image initially displayed on the display screen and a portion of the image initially not displayed on the display screen. The technique of the present disclosure may provide flexibility in showing the interested area as large as possible on the display screen.

In addition, the technique of the present disclosure may only load and display the user selected target area or portion of interest of the image for subsequent display, and not the portion or portions of the image disposed outside the boundary of the user selected target area, which may allow for more efficient and faster processing times of the user selected target area for display.

FIGS. 1-4 depict various embodiments of computing, including cloud computing, in accordance with one or more embodiments set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
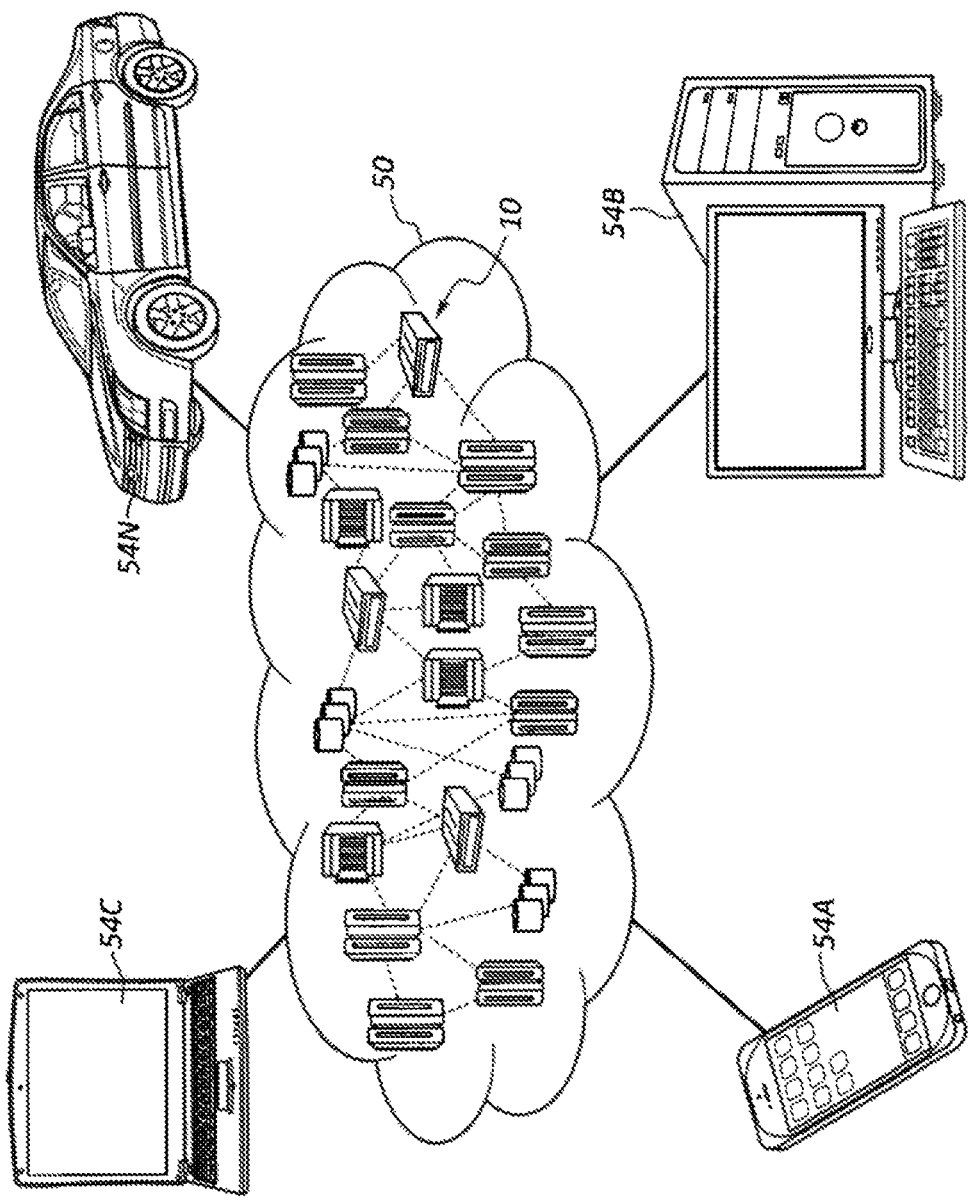
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
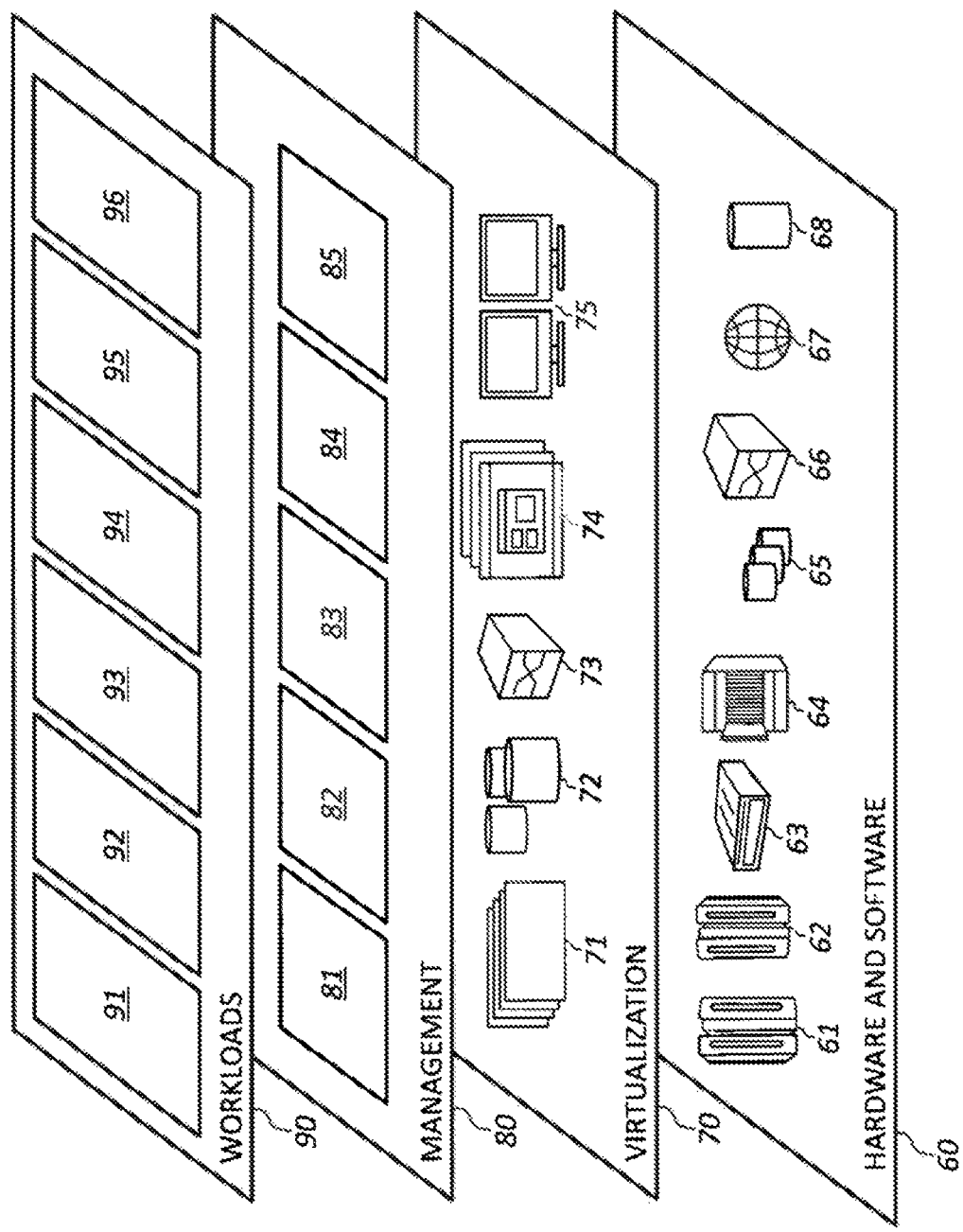
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and display control resources 96 as described herein.

Figure 4:
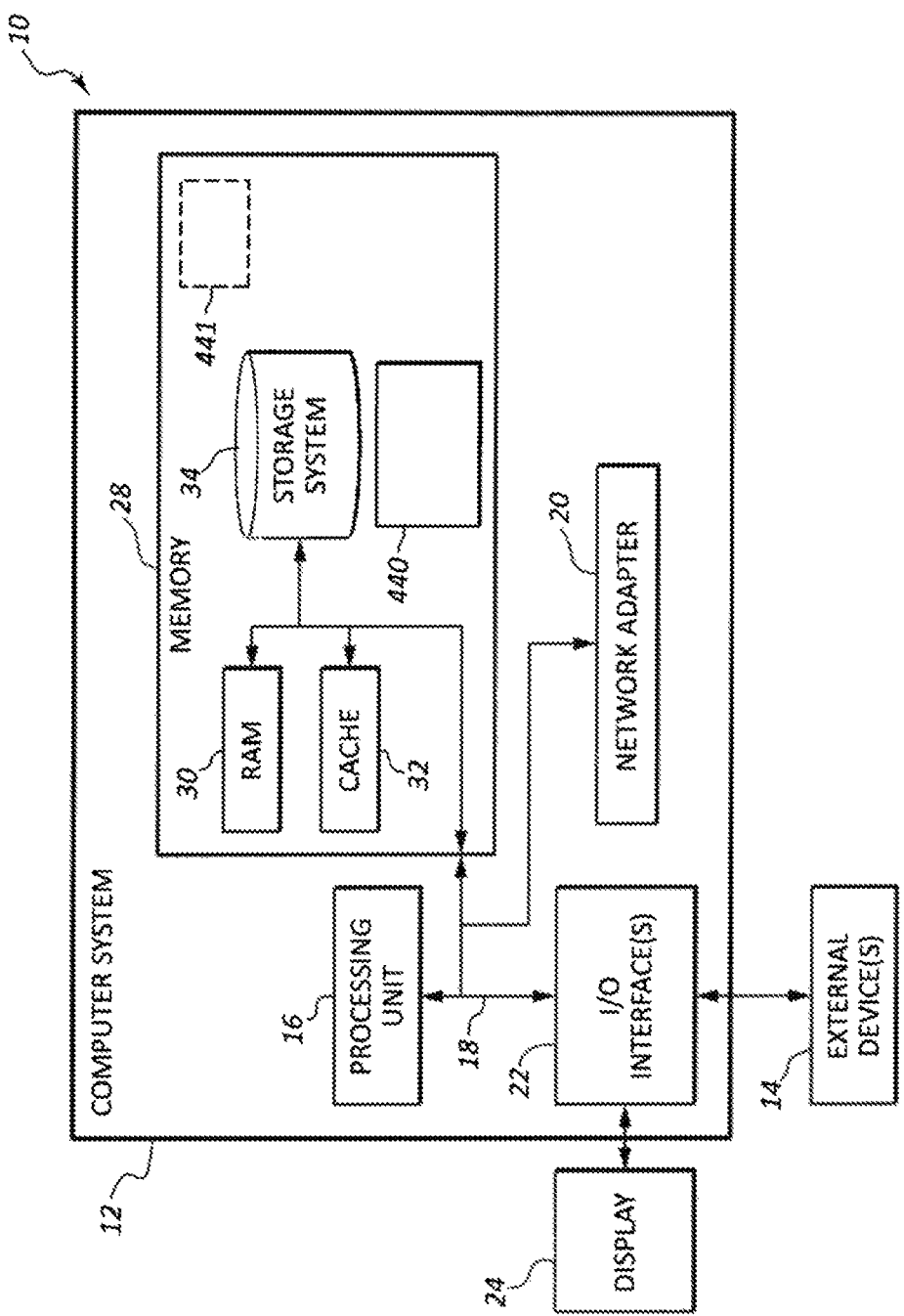
FIG. 4 depicts a hardware overview of a computing node according to an embodiment of the present invention.

FIG. 4 depicts a hardware overview of a computing node 10, which may be a cloud computing node, in accordance with one or more embodiments set forth herein. The computing node as set forth in FIG. 4 can include the hardware components as set forth in reference to computing node 10 as set forth in reference to FIG. 1. By way of example, computing node 10 may generally be any of the computing devices described herein, such as network devices, client computers, server computers, etc. as set forth in FIG. 4.

Program/utility 40 as set forth in FIG. 1 can provide the functionality of display control resources 96 as set forth in FIG. 3. Program/utility 40 as set forth in FIG. 1 can include one or more program 440 as set forth in FIG. 4, and program/utility 40 as set forth in FIG. 1 can optionally include some or all of one or more program 441.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441) generally carry out the functions and/or methodologies of embodiments of the invention as described herein, such as display control resources 96 (FIG. 3).

Referring again to FIG. 4:

The present invention may be a system, a method, and/or a computer program product. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
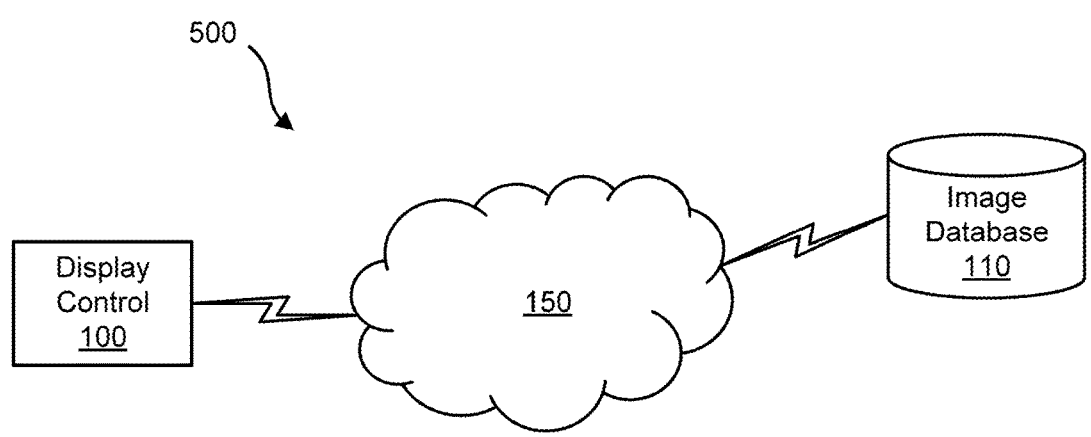
FIG. 5 is an exemplary block diagram of a system according to an embodiment of the present invention.

FIG. 5 is an exemplary block diagram of a system 500, in accordance with one or more embodiments set forth herein. For example, a network 150 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which one or more display control 100 may, for example, control display of an image on a display screen. In one example, display control 100 can be in communication with one or more image database 110. As described in greater detail below, display control 100 may be effective for displaying a portion of an image according to a user selected area relative to an initial image disposed on a display screen. For example, the image database may be images of maps, map routes, photographs, computer-aided-design (CAD) drawings, or other images or data that may be represented on a display screen. The one or more image database 110 shown as being in communication via network 150 can alternatively be co-located at display control 100. For example, an electronic device such as a hand held device such as a mobile phone, a smart phone, a personal digital assistant (PDA), a tablet device, an internet device, or other electronic devices or products may include a display control and a screen display.

Figure 6:
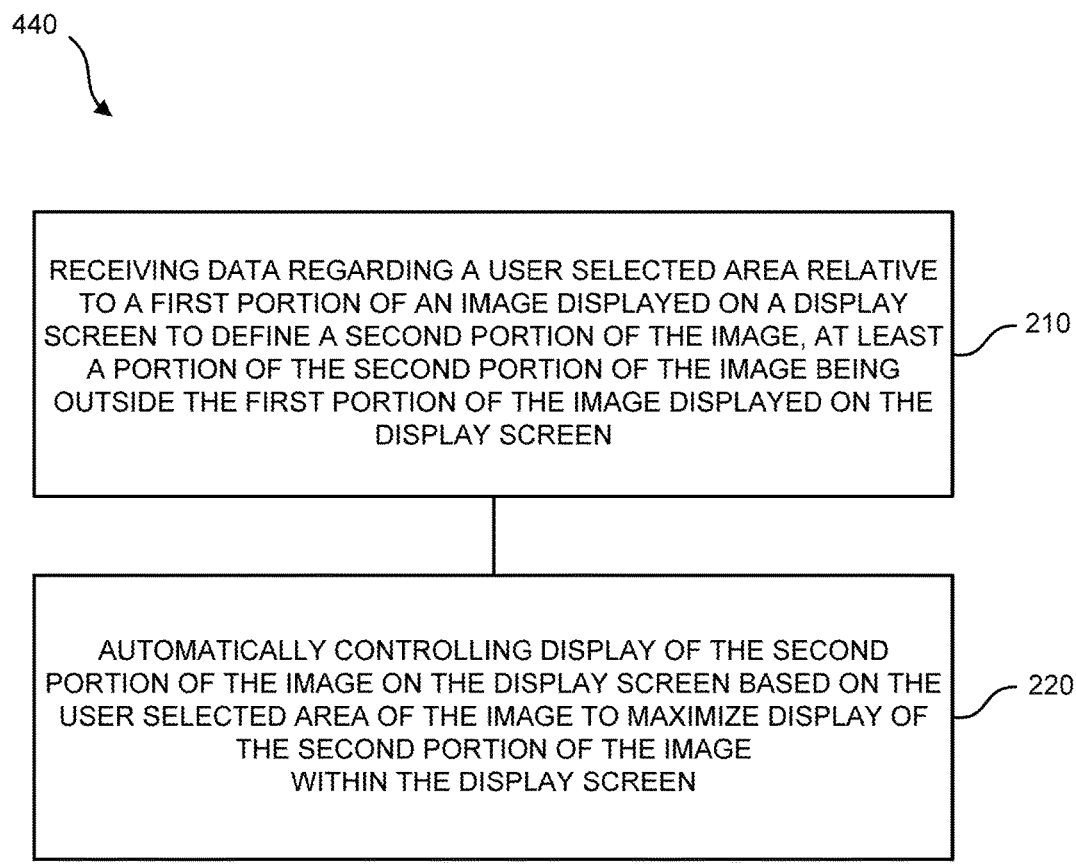
FIG. 6 is a flowchart of a method according to an embodiment of the present invention.

FIG. 6 illustrates a process, for example, for use in controlling display of an image on a display screen in accordance with embodiments of the present disclosure. By way of example, the processes described with respect to FIG. 6 can be performed using one or more program 440 (FIG. 4) or one or more program 441 (FIG. 1) on one or more device having display control 100 (FIG. 5), as detailed with respect to FIG. 4.

For example, one or more program 440 may include at 210, receiving, by one or more processor, data regarding a user selected area relative to a first portion of an image displayed on a display screen to define a second portion of the image, at least a portion of the second portion of the image being outside the first portion of the image displayed on the display screen, and at 220 automatically controlling, by the one or more processor, display of the second portion of the image on the display screen based on the user selected area of the image to maximize display of the second portion of the image within the display screen.

FIGS. 7-11 diagrammatically illustrate user selected target areas relative to an image and display of the user selected target areas of an image on the display screen of electronic device in accordance with embodiments of the present disclosure. For example, the display screen of the electronic device may initially display an image such as a map or map route between a point A and B, and a user using the electronic device may select a portion of the map or map route for subsequent display on the display screen, which selected portion may be automatically displayed of the display screen.

Figure 7:
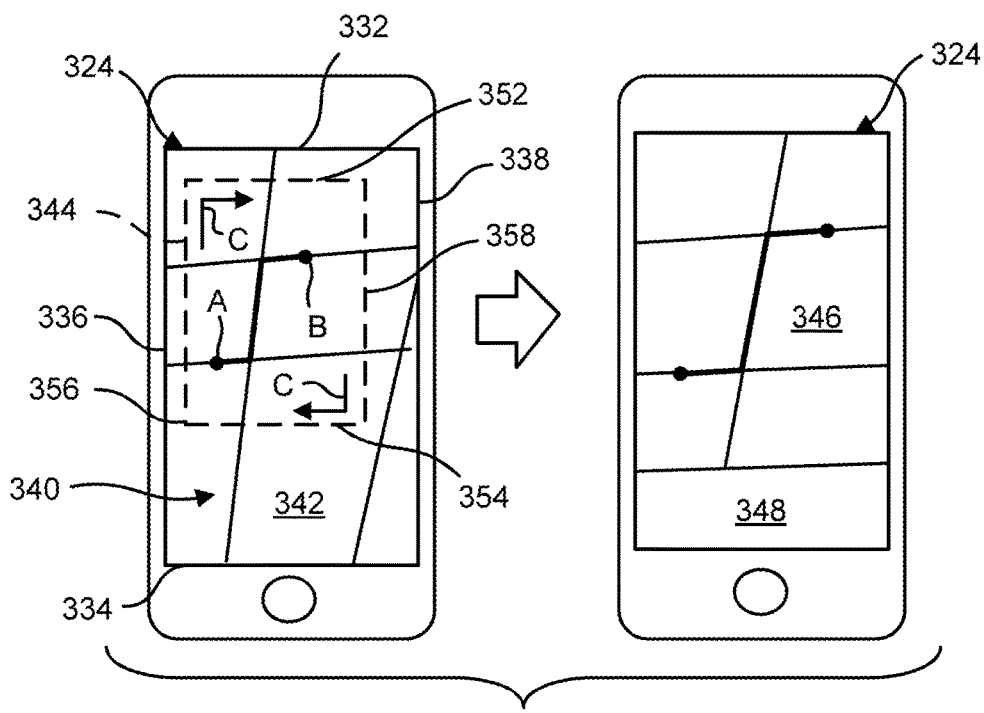
FIGS. 7-11 diagrammatically illustrate, for example, control of the image on a display screen according to embodiments of the present invention.

In one example, as shown in FIG. 7, initially a first portion 342 of an image 340 may be displayed on a display screen 324. For example, image 340 may be a map having roads and a map route illustrated between two points. A user may select a desired or target area 344 disposed within the displayed first portion 342 of image 340, such as using a camera or smartband as described in greater detail below. For example, in some embodiments, a user may use his finger to trace the target area adjacent to the display screen such as the peripheral boundary or a portions thereof of the target area such as shown by arrows C in FIG. 7. The trace may be a single continuous trace or a plurality of separate traces. User selected target area 344 may be used for display of an enlarged or zoomed in second portion 346 of the image displayed on display screen 324. For example, display screen 324 may be bounded by a top edge 332, a bottom edge 334, a left side edge 336, and a right side edge 338. For example, the electronic device may include a rectangular display screen, and a user selected area may be a rectangular area of the first portion of the image displayed on the display screen. For example, target area 344 may be bounded by a top edge 352, a bottom edge 354, a right side edge 356, and a left side edge with 358. The user selected target area 344 may be used by one or more program 440 (FIG. 6) such as received at 210 (FIG. 6) and allow automatically controlling display such as at 220 (FIG. 6) so that the size of the second portion of the image is maximized or zoomed in and translated to fit in the display screen. The maximized second portion of the image may be based on the orientation of the first portion of the image displayed to the user and/or the orientation of the display screen.

Figure 8:
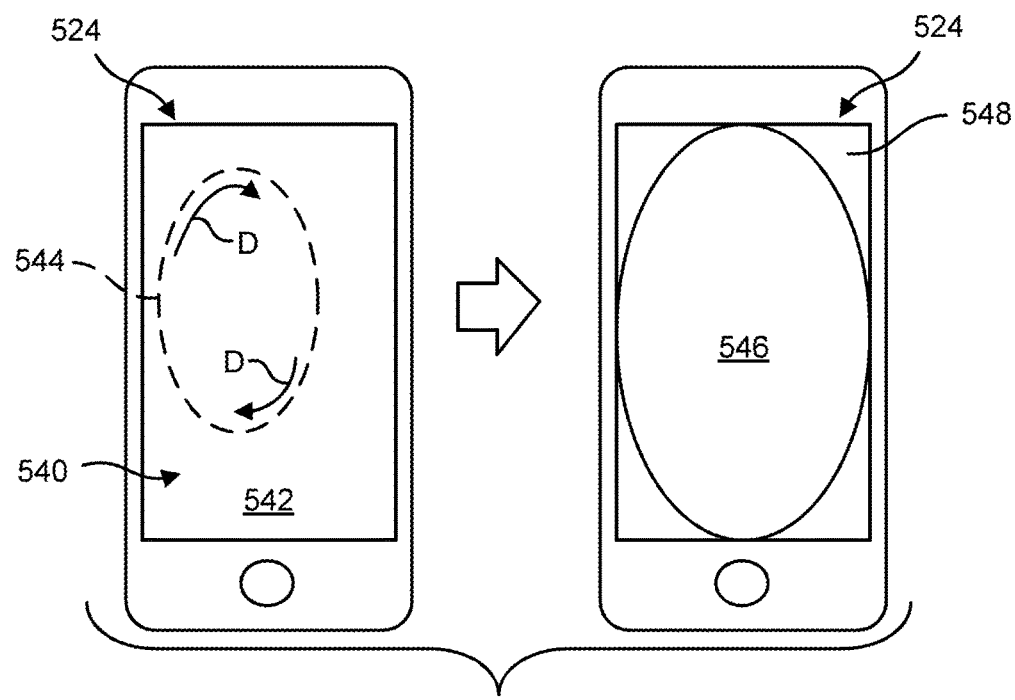

In another example as shown in FIG. 8, initially a first portion 542 of an image 540 may be displayed on a display screen 524. A user may select a desired target area 544 disposed within the displayed first portion 542 of image 540 such as using a camera or smartband as described in greater detail below. For example, in some embodiments, a user may use his finger to trace the target area adjacent to the display screen such as the peripheral boundary or a portions thereof of the target area such as shown by arrows D in FIG. 8. The trace may be a single continuous trace or a plurality of separate traces. User selected target area 544 may be used for display of an enlarged or zoomed in second portion 546 of the image displayed on display screen 524. For example, the electronic device may include a rectangular display screen, and a user selected area may be an oval area of the first portion of the image displayed on the display screen. The user selected target area 544 may be used by one or more program 440 (FIG. 6) such as received at 210 (FIG. 6) and allow automatically controlling display such as at 220 (FIG. 6) so that the size of the second portion of the image is maximized or zoomed in and translated to fit in the display screen. The maximized second portion of the image may be based on the orientation of the first portion of the image displayed to the user and/or the orientation of the display screen.

Figure 9:
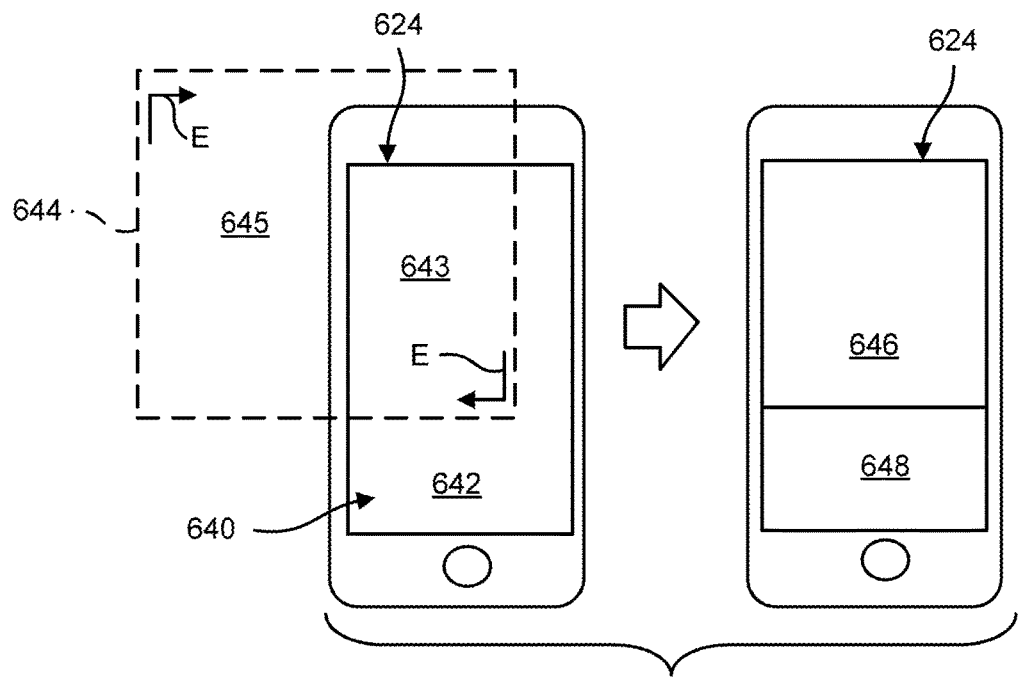

In another example as shown in FIG. 9, initially a first portion 642 of an image 640 may be displayed on a display screen 624. A user may select a desired target area 644 having a portion 643 which is disposed within the displayed first portion 642 of image 640, and a portion 645 of which is disposed outside the displayed first portion 642 of image 640 such as using a camera or smartband as described in greater detail below. For example, in some embodiments, a user may use his finger to trace the target area adjacent to the display screen such as the peripheral boundary or a portions thereof of the target area such as shown by arrows E in FIG. 9. The trace may be a single continuous trace or a plurality of separate traces. User selected target area 644 may be used for display of a second portion 646 of the image displayed on display screen 624. For example, the electronic device may include a rectangular display screen, and a selected target area may be a generally square area. The user selected target area 644 may be used by one or more program 440 (FIG. 6) such as received at 210 (FIG. 6) and allow automatically controlling display such as at 220 (FIG. 6) so that the size of the second portion of the image is maximized or zoomed out and translated to fit in the display screen. The maximized second portion of the image may be based on the orientation of the first portion of the image displayed to the user and/or the orientation of the display screen.

Figure 10:
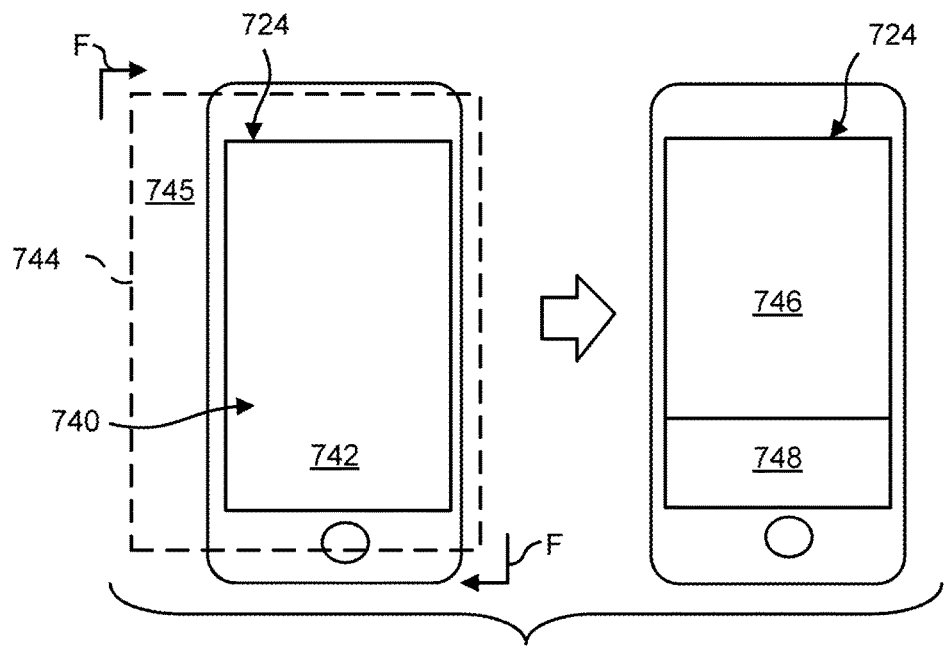

In another example as shown in FIG. 10, initially a first portion 742 of an image 740 may be displayed on a display screen 724. A user may select a desired target area 744 having a portion of which corresponding to first portion 742, and a portion 745 of which is disposed outside the displayed first portion 742 of image 740 such as using a camera or smartband as described in greater detail below. For example, in some embodiments, a user may use his finger to trace the target area adjacent to the display screen such as the peripheral boundary or a portions thereof of the target area such as shown by arrows F in FIG. 10. The trace may be a single continuous trace or a plurality of separate traces. User selected target area 744 may be used for display of a second portion 746 of the image displayed on display screen 530. For example, the electronic device may include a rectangular display screen, and a selected area may be a generally rectangular area of the image. The user selected area 744 may be used by one or more program 440 (FIG. 6) such as received at 210 (FIG. 6) and allow automatically controlling display such as at 220 (FIG. 6) so that the size of the second portion is maximized, in this case zoomed out and translated to fit in the display screen. The maximized second portion of the image may be based on the orientation of the first portion of the image displayed to the user and/or the orientation of the display screen.

Figure 11:
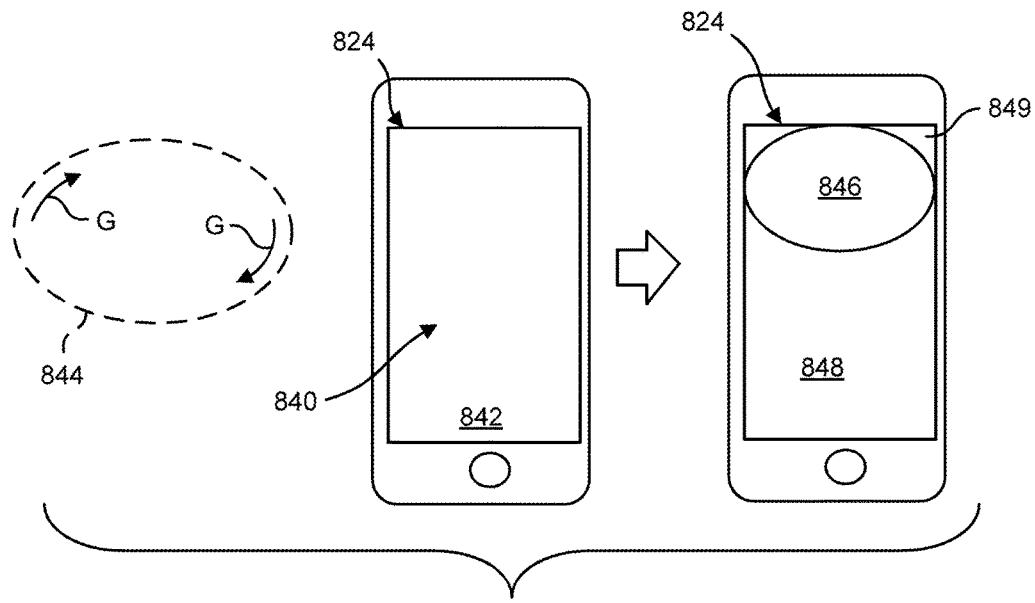

In another example as shown in FIG. 11, initially a first portion 842 of an image 840 may be displayed on a display screen 824. A user may select a desired target area 844 which is disposed outside the displayed first portion 842 of image 840 such as using a camera or smartband as described in greater detail below. For example, in some embodiments, a user may use his finger to trace the target area adjacent to the display screen such as the peripheral boundary or a portions thereof of the target area such as shown by arrows G in FIG. 11. The trace may be a single continuous trace or a plurality of separate traces. User selected target area 844 may be used for display of a second portion 846 of the image displayed on display screen 824. For example, the device may include a rectangular display screen, and a selected area may be a generally oval area of the image. The user selected area 844 may be used by one or more program 440 (FIG. 6) such as received at 210 (FIG. 6) and allow automatically controlling display such as at 220 (FIG. 6) so that the size of the second portion is maximized, in this case zoomed out and translated to fit in the display screen. The maximized second portion of the image may be based on the orientation of the first portion of the image displayed to the user and/or the orientation of the display screen. For example, in the event that the user turns the display, e.g., turns a smartphone having the display, the second portion may be maximized based on the orientation of the display screen, e.g., providing a maximized second portion based on a screen display orientated in a portrait view or landscape view. For example, rotating the electronic device 90 degrees may allow for the oval-shaped second portion of the image to be enlarged in a landscape view of the display screen compared to the oval-shaped second portion of the image being displayed in the portrait view of the display screen as illustrated in FIG. 11.

With reference again to FIGS. 7-11, it is noted that depending on the shape of the screen and the selected target area of interest, there may be portions of the displayed image of the subsequent second image portion that is not of interest or have non-related information. For example, the user selected area may be used by one or more program 440 (FIG. 6) such as received at 210 (FIG. 6) and allow automatically controlling display such as at 220 (FIG. 6) so that portions of the image outside the second maximized and translated portion of the image is not loaded. With reference still to FIGS. 7-11, a bottom portion 348 (FIG. 7), corner portions 548 (FIG. 8), a portion 648 (FIG. 9), a portion 748 (FIG. 10), and a bottom portion 848 and corner portions 849 (FIG. 11), may not be loaded and remain blank which may be more efficient in allowing for faster processing and display of the interested portions of the image, as well as being less distracting to the user. While the second portions of the image are illustrated as being disposed closer to the top of the screen display, the second portions may be disposed in the middle or on other areas of the display screen. From the present description, it will be appreciated that in some embodiments, data regarding the image, the first portion of the image, and the second portion of the image for display on the display screen may be contained in the electronic device, contained on cloud computing environment 50 (FIG. 2), or a combination thereof.

Figure 12:
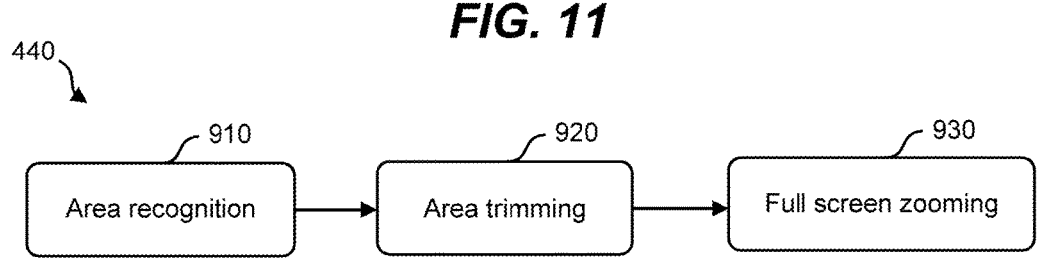
FIG. 12 illustrates a flowchart of a method according to an embodiment of the present invention.

FIG. 12 illustrates another process, for example, for use in controlling display of an image on a display screen in accordance with embodiments of the present disclosure. By way of example, the processes described with respect to FIG. 12 can be performed using one or more program 440 (FIG. 4) on one or more device having display control 100 (FIG. 5), as detailed with respect to FIG. 4.

For example, one or more program 440 may include at 910, capturing or receiving a user selected target area having arbitrary boundaries. If the boundaries of the selected target area of the image are all on the display screen, the target area recognition module recognized the area as the target area. If any boundary of the selected target area is out of the screen, the target area recognition module is used to decide the boundaries of the virtual part to complete the target area. After the boundaries of the selected area are determined, including physical boundaries on the screen and virtual boundaries out of the screen, at 920, the shape of the user selected area is coordinated such as trimmed to the display screen, for example to the height-width ratio of the display screen so that a second portion of the image corresponding to the selected target area is maximized to fit in the display screen. At 930, the second portion is zoomed in or out and/or translated so that it may be fully displayed on the display screen.

With reference again to FIG. 4, in one embodiment, input/output device 22 or external devices 14 may include one or more cameras for receiving input or data from a user regarding the selected target area such as size and position relative to the display screen.

For example, one or more cameras may be employed to track a user's hand movement in the air when selecting the target area. A front camera and/or a rear camera on the electronic device may be used for capturing the user's movement, e.g., desirably with the users and movement not being exactly on the same 2D plane of the electronic device or the display screen. A wide-angle or even super wide-angle camera can capture a 170 degree or a 180 degree range, e.g., Fish Fisheye Lens 180 Degree Super Wide Angle for IPhone 6, Samsung S5, or Note. In this way, the user's movement may be captured even if it is on the same plane of the electronic device. Existing technologies may be employed for detecting and recording the trace of a user's hand movement. For example, a user moving one's hand may be detected from a background and its movement tracked by using image recognition technologies on a pixel level. Other technologies include, e.g., tracking an object from a live video input.

Figure 13:
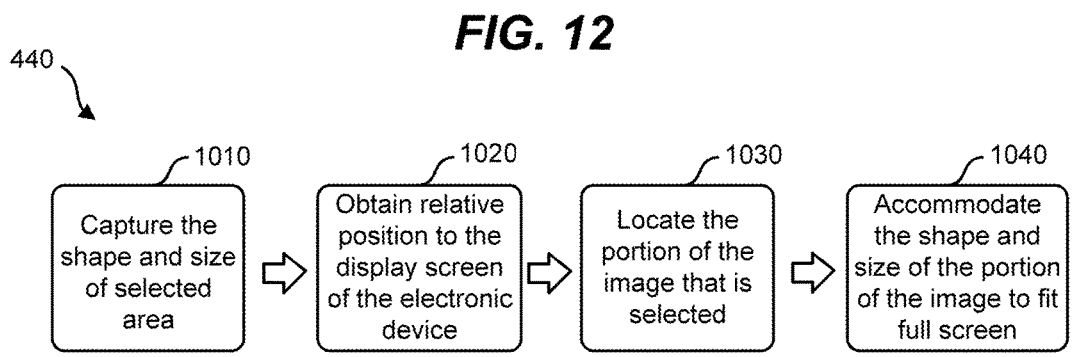
FIG. 13 illustrates a flowchart of a method according to an embodiment of the present invention.

FIG. 13 illustrates another process, for example, for use in controlling display of an image on a display screen in accordance with embodiments of the present disclosure. By way of example, the processes described with respect to FIG. 13 can be performed using one or more program 440 (FIG. 4) on one or more device having display control 100 (FIG. 5), as detailed with respect to FIG. 4.

For example, one or more program 440 may include at 1010, capturing the shape and the size of the selected target area, and at 1020, obtaining the relative position of the selected target area to the screen display of the electronic device. At 1030, the selected target area is used to locate the corresponding portion of the image. At 1040, the shape and side of the corresponding portions of the image is accommodated, e.g., translated, zoomed in, and/or zoomed out, to fit or maximize the viewing on the display screen.

When a trace of a user's movement of the selected target area is recorded, the size of the selected target area bounded by or encircled by the trace may be calculated by using the focal length of the camera, the image size of this area generated by the camera, and the image distance of this imaging. For example, with reference again to FIG. 4, in another embodiment, external device 14 may include one or more cameras for receiving input or data from a user regarding the selected target area such as size and position relative to the display screen.

For example, with reference to FIG. 14, a calculation for use in determining the user selected target area may be as follows, where $h_o$ is the actual object height, $h_i$ is the imaged object height, m is the magnification ratio, f is the camera's focal length, and v is the image distance between the lens plane and the image plane. From the following two equations:

$$m = h_i/h_o; \text{ and}$$

$$m = (v/f) - 1 = (v-f)/f$$

the actual height of the object can be worked out as:

$$h_o = h_i/m = h_i * f/(v-f)$$

Similarly, based on the mirroring relationship between the user selected target area and its image behind the lens as shown in FIG. 14, the relative position of the selected target area and the lens (or the electronic device) can be calculated from the relative position of the image and the lens.

With reference to FIGS. 15 and 16, and based on the size of the selected target area and its relative position to the electronic device, a 2-dimensional coordinate system may be used for acquiring the second portion of the image that is desired to be select from the image.

As shown in FIG. 14, an image 1140 and user selected target area 1144 represents the virtual selected target area selected by the user. The center of the screen may be used as the central point of the 2-dimensional coordinate system for locating and positioning the elements based on the shape and location data as determined above. Then, the size of this selected target area is adjusted or mapped to, for example, the largest size that can fit the full screen of the display screen as shown in FIG. 16.

With reference again to FIG. 4, in another embodiment, external device 14 may include a wearable device such as a smartband for receiving input or data from a user regarding the selected target area such as size and position relative to the display screen.

For example, the smartband may be a wristwatch-type input device that recognizes human hand gestures by capacitively measuring wrist-shape changes and also measuring forearm movements. The device may include two input sensors (capacitance and acceleration sensors), and one tactile feedback actuator. The device may recognize hand gestures by measuring the changes of the arm shape on the inside of the wrist-band using a combination of transmitter and receiver electrodes attached to the back of the watch dial and inside of the wristband. This combination may acts as a capacitance sensor. In addition to the hand-shape measurement, an acceleration sensor (Analog Devices ADXL202) may be mounted on the wristwatch dial. The acceleration sensor may be a solid-state 2-axis sensor for measuring the inclination of the forearm. By recording data collected by capacitance and acceleration sensors, hand movement can be used to obtain a trace a user selected target area. By using the positioning sensors in smartband and the electronic device, the relative size and position of the traced selected target area may be obtained. Then, the selected virtual area may be mapped to the full screen of the display.

With reference still to FIG. 4, in other embodiment, display 24 and external device 14 may be one or more cameras, smartbands, eye tracking devices, or other suitable devices, and combinations thereof for receiving input or data from a user regarding the selected target area which may be processed in accordance with embodiments of the present disclosure.

Figure 17:
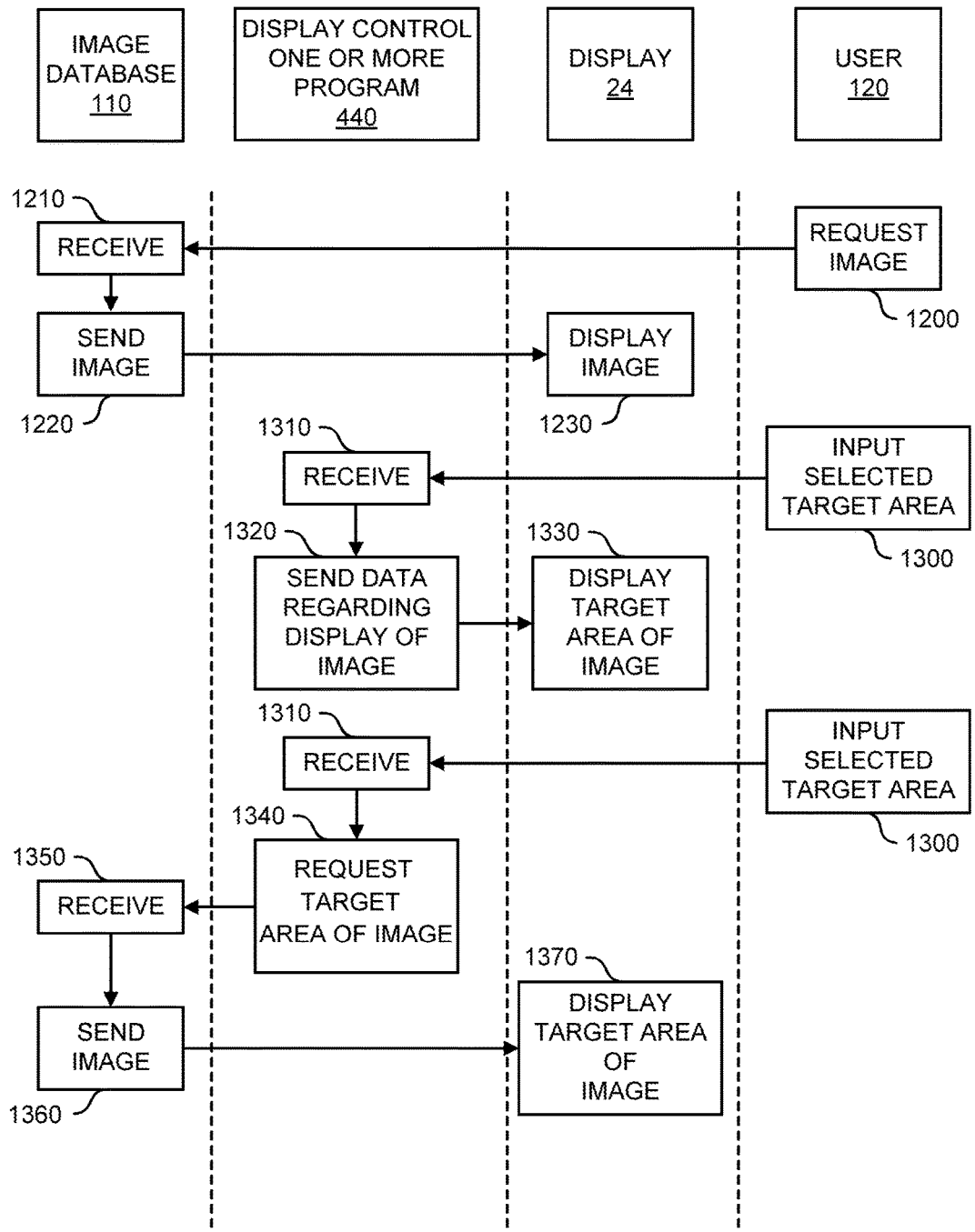
FIG. 17 is a diagram illustrating embodiments of a process according to an embodiment of the present invention, for example, for controlling display of an image on the display screen.

FIG. 17 is a diagram illustrating further processes, for example, for controlling display of an image on a display screen in accordance with one or more embodiments set forth herein. By way of explanation, in FIG. 17, processes are illustrated from the point of view of an image database 110 (e.g., such as image database 24 of FIG. 5), display control one or more programs 440 (e.g., display control one or more programs 440 or 441 running on display control 100 of FIG. 5), a display 24 (e.g., display 24 of FIG. 4), and a user 120. User 120 can refer to a human user of a user interface of the one or more program 440. A user interface may include one or more cameras, smartbands.

In one or more embodiments, one or more program 440 may run on a different collection of physical or virtual machines or processors, depending on the need for scalability of the system. In one specific example, one or more program 440 could run on a single multiprocessor server system. In another specific example, various portions of one or more program 440 may run on different processors running on different computing nodes.

By way of overview, FIG. 17 illustrates, at least in part, one or more embodiments for controlling display of an image on a display screen. It will be understood that based on a different set or order of user inputs one or more program 440 can provide different functionality than the functionality described with reference to FIG. 17.

Initially a user may send at block 1200 a request for an image to image database 110, which request is received at block 1210. Image database 110 may send at block 1220 an image which is displayed on display 24 at block 1230.

In one embodiment, a user viewing the display on the image on a display screen, may input a selected target area relative to the image displayed on the display at block 1300 such as explained above. At block 1310, display control one or more program 440 may receive the inputted selected target area. Display control one or more program 440 may at block 1320 send data regarding display of the image to display 24 such as data for resizing and/or translating the display of the image as described above, which is implemented at block 1330 on display 24. The process may be repeated by the user for further viewing of portions of the image.

In another embodiment, a user viewing the display on the image on a display screen, may input a selected target area relative to the image displayed on the display at block 1300 such as explained above. At block 1310, display control one or more program 440 may receive the inputted selected target area. Display control one or more program 440 may at block 1340 send a request for a resized and/or a translated image to image database 110, which is received at image database 110 at block 1350. At block 1360, the resized and/or a translated image is sent to display 24 for display for viewing by the user at block 1370. The process may be repeated by the user for further viewing of portions of the image.

From the present description, it will be appreciated that techniques of the present disclosure allow a user selected target area of an image for enlargement that may be any shape and any size, and when a display control process or a smart full screen operation is performed, the selected area may be automatically enlarged/reduced and fitted onto the screen. For example, the selected area may be enlarged as much as possible based on the size of the display, e.g., one or more side portions of the selected area being moved to one or more side edges of the display screen.

As described above, the technique of the present disclosure may allow a user to quickly fit a desired selected area on a screen or out of the screen into a full screen display. Benefits of the present technique may include the selected area being of any shape, so that the screen would be used sufficiently to display that portion of an image of interest. The selected area may include a portion of the image that is initially out of view of the screen. A partial loading operation of only the portions of the image corresponding to the user's selected target area may be more efficient since only the interested part of the image is loaded.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the present disclosure and the practical application, and to enable others of ordinary skill in the art to understand the present disclosure as described herein for various embodiments with various modifications as are suited to the particular use contemplated.

The invention claimed is:

1. A method comprising:
   receiving, by one or more processor, data regarding a user selected area relative to a first portion of an image displayed on a display screen to define a second portion of the image, at least a portion of the second portion of the image being outside the first portion of the image displayed on the display screen, wherein the first portion of the image displayed on the displayed screen comprises an entirety of an area of the image displayed on the display screen; and
   automatically controlling, by the one or more processor, display of the second portion of the image on the display screen based on the user selected area of the image, and wherein the receiving includes receiving data of an area traced by the user to indicate the user selected area, wherein the area traced includes an area outside of the display screen.

2. The method of claim 1, wherein the automatically controlling comprises automatically controlling display of the second portion of the image on the display screen based on the user selected area of the image by translating the second portion of the image within the display screen.

3. The method of claim 1, wherein the receiving is performed so that the at least a portion of the second portion is outside of the entirety of the area of the image displayed on the display screen.

4. The method of claim 1, wherein the area traced includes an area outside of a volumetric area extending perpendicularly and infinitely from an area of the display screen that is bounded by a peripheral boundary of the display screen, and wherein the receiving data includes receiving data of the user tracing the area outside of a volumetric area extending perpendicularly and infinitely from an area of the display screen that is bounded by a peripheral boundary of the display screen.

5. The method of claim 1, wherein the receiving data comprises receiving data regarding the user selected area of the image defining the second portion of the image without the user touching the display screen.

6. The method of claim 1, wherein the receiving includes tracking an area traced by the user to indicate the user selected area, the area traced including an area outside of the display screen, wherein the tracking is performed using a camera disposed in a device having the display screen.

7. The method of claim 1, wherein the receiving is performed using a sensor of a wearable device worn by the user, the wearable device external to a device having the display screen, wherein the receiving includes receiving from the wearable device data of the area traced by the user to indicate the user selected area.

8. The method of claim 1, and wherein the receiving is performed so that a first part of the second portion is outside of the entirety of the area of the image displayed on the display screen and further so that a second part of the second portion is inside of the entirety of the area of the image displayed on the display screen.

9. The method of claim 1, wherein the receiving is performed so that an entirety of the second portion is outside of the entirety of the area of the image displayed on the display screen.

10. The method of claim 1, and wherein the receiving data includes receiving data of the user tracing the area outside of the display screen.

11. The method of claim 1, wherein the area traced includes an area outside of a volumetric area extending perpendicularly and infinitely from an area of the display screen that is bounded by a peripheral boundary of the display screen.

12. The method of claim 1, wherein an entirety of the display screen displays the first portion of the image.

13. The method of claim 1, wherein the receiving data of an area traced by the user to indicate the user selected area is performed so that the second portion of the image includes an entirety of the first portion of the image.

14. The method of claim 1, wherein the receiving data of an area traced by the user to indicate the user selected area is performed so that the second portion of the image is absent of any portion of the first portion of the image.

15. A computer program product comprising:
   a computer readable storage medium readable by one or more processing circuit and storing instructions for execution by one or more processor for performing a method comprising:
      receiving, by one or more processor, data regarding a user selected area relative to a first portion of an image displayed on a display screen to define a second portion of the image, at least a portion of the second portion of the image being outside the first portion of the image displayed on the display screen, wherein the first portion of the image displayed on the displayed screen comprises an entirety of an area of the image displayed on the display screen; and
      automatically controlling, by the one or more processor, display of the second portion of the image on the display screen based on the user selected area of the image, and wherein the receiving includes receiving data of an area traced by the user to indicate the user selected area, wherein the area traced includes an area outside of the display screen.

16. The computer program product of claim 15, wherein the receiving includes tracking an area traced by the user to indicate the user selected area, wherein the tracking is performed using camera disposed in a device having the display screen.

17. The computer program product of claim 15, wherein the receiving includes tracking an area traced by the user to indicate the user selected area, wherein the tracking is performed using a sensor of a device wearable by the user external to a device having the display screen.

18. The computer program product of claim 15, wherein the receiving includes tracking an area traced by the user to indicate the user selected area, wherein the tracking is performed using a sensor of a wearable device worn by the user, the wearable device external to a device having the display screen, wherein the receiving includes receiving from the wearable device data of the area traced by the user to indicate the user selected area.

19. The computer program product of claim 15, wherein the receiving includes tracking an area traced by the user to indicate the user selected area, wherein the tracking is performed using a sensor of a wearable device worn by the user, the wearable device external to a device having the display screen, wherein the receiving includes receiving from the wearable device data of an area traced by the user to indicate the user selected area, wherein the area traced includes an area outside of the display screen, and wherein the receiving data includes receiving data of the user tracing the area outside of the display screen.

20. A system comprising:
  a memory;
  one or more processor in communication with the memory; and
  program instructions executable by the one or more processor via the memory to perform a method comprising:
    receiving, by one or more processor, data regarding a user selected area relative to a first portion of an image displayed on a display screen to define a second portion of the image, at least a portion of the second portion of the image being outside the first portion of the image displayed on the display screen, wherein the first portion of the image displayed on the displayed screen comprises an entirety of an area of the image displayed on the display screen; and
    automatically controlling, by the one or more processor, display of the second portion of the image on the display screen based on the user selected area of the image, and wherein the receiving includes receiving data of an area traced by the user to indicate the user selected area, wherein the area traced includes an area outside of the display screen.

* * * * *